United States Patent [19]

Iverson

[11] Patent Number: 4,515,074
[45] Date of Patent: May 7, 1985

[54] BARBECUE COOKING UNIT

[76] Inventor: Kjeld K. Iverson, R.R. 1, Pender Island, British Columbia, Canada, V0N 2M0

[21] Appl. No.: 606,677

[22] Filed: May 3, 1984

[51] Int. Cl.³ .............................................. A47J 37/07
[52] U.S. Cl. ...................................... 99/393; 99/448; 126/25 A
[58] Field of Search ................. 99/385, 393, 448, 449, 99/450; 126/25 A, 41 E, 9 R

[56] References Cited

U.S. PATENT DOCUMENTS

| | | | |
|---|---|---|---|
| 1,540,434 | 6/1925 | Stone | 126/25 A |
| 2,058,172 | 10/1936 | Myers | 126/41 E |
| 2,255,466 | 9/1941 | Jenkins | 99/385 X |
| 2,868,189 | 1/1959 | Watrous | 126/25 A |
| 3,096,706 | 7/1963 | Cardwell | 126/25 A X |
| 3,692,012 | 9/1972 | Wiggins | 126/25 R |

FOREIGN PATENT DOCUMENTS

| | | | |
|---|---|---|---|
| 493280 | 9/1977 | Australia | 126/25 A |
| 2298301 | 9/1976 | France | 126/25 A |
| 1489534 | 10/1977 | United Kingdom | 126/25 A |

*Primary Examiner*—Philip R. Coe
*Assistant Examiner*—Frankie L. Stinson
*Attorney, Agent, or Firm*—Hughes, Barnard & Cassidy

[57] ABSTRACT

A barbecue cooking unit is comprised of a coal well having an open top, defined within a bottom wall and upstanding sidewalls; support legs for securing the coal well in a generally upright position; a lid depending from the rear support legs for compound degrees of movement relative thereto, being in pivotable engagement therewith to a closed position over the open top and in vertically sliding receipt therewith over an adjustable range in a cooking position; and grill support members on the lid member for receiving perforate grills; wherein the lid member is selectively pivotable into sealing engagement with the coal well for extinguishing coals contained therein when in the closed position and is selectively slidable over the vertically adjustable range to present the grill supports at a desired vertical level over the coal well when in the cooking position.

4 Claims, 3 Drawing Figures

BARBECUE COOKING UNIT

BACKGROUND OF THE INVENTION

1. Field of the Invention

The present invention relates, generally, to barbecue cooking units and, more especially, to a portable, self-extinguishing barbecue grill having a closure member for sealing engagement with the coal well of the unit in order to smother burning coals following a cooking procedure.

2. Description of the Background Art

Portable cooking units, in the nature of barbecue grills and the like, are of course quite well known. Such devices typically include a coal well or receptable within which charcoal or similar fuel is burned to generate heat for cooking, coupled with some means to support a perforate grill member which positions food to be cooked above that heat source. Typically, the grill members are vertically adjustable in order to position the food at a desired location over the heat source in order to regulate the effective cooking temperature at the grill level accounting for, amongst other things, the variation in temperature provided by the heat source.

It is oftentimes desirable to extinguish the charcoal once a cooking procedure has been concluded. Under many circumstances the coals are not spent after the food items have been grilled and the residual portion can very efficiently be employed for a subsequent cooking operation. Some have approached this objective on an ad hoc basis, for example dousing the burning embers with water for that purpose. However, that is usually not the most effective or efficient approach, inasmuch as the saturation of the coals renders them less fit for subsequent grilling (due, in part, to interaction with the binder constituents or the like used in manufacture of the coals) while also contributing to corrosion and perhaps premature failure of the metallic components constituting the grill structure.

With those thoughts in mind, certain designs have arisen which provide a type of self-extinguishing feature for the charcoal fuel used in these types of barbecue units. A common approach to that end is the provision of some variety of sealing member which effectively closes the coal well and smothers the burning embers upon depletion of oxygen within the sealed or confined space. Along such lines reference is made to U.S. Pat. Nos. 3,667,446, 3,976,046, and 4,046,132; either providing or otherwise adaptable for providing a type of self-extinguishing feature. Along more general lines, note U.S. Pat. Nos. 2,786,463 and 2,866,883.

While the aforementioned patent references, or at least certain of same, provide units which include a type of self-extinguishing feature for the charcoal embers, the art has yet to provide a highly versatile portable barbecue unit of simple design and construction but one which nonetheless operates quite efficiently. The prior art grills of this ilk tend to be rather complicated affairs of nesting or interrelated members necessary to achieve both a suitable range of cooking positions and the self-extinguishing advantage. Thus, the need exists to achieve the conceptual objective of the prior art, but in a way which is more straightforward and which provides greater versatility for the barbecue unit.

SUMMARY OF THE INVENTION

The present invention responds to the needs in the art to provide a versatile cooking unit of trim design but which is nonetheless highly efficient in both cooking and storage modes; the latter including the ability to extinguish burning embers in order that the same may be saved for future use. The barbecue unit of the present invention economizes on the number of components required and, thus, offers efficiency in manufacture as well as operation.

The foregoing advantages are achieved in a barbecue cooking unit comprised of a coal well having an open top, defined within a bottom wall and upstanding sidewall; support means for securing the coal well in a generally upright cooking position; lid means for covering the open top in sealing engagement there within order to extinguish burning embers following a cooking operation, which lid means depends from the support means for compound motion with respect thereto, being in pivotable engagement to a closure position and in vertically sliding receipt therewith over an adjustable range in a cooking position; and grill support means on the lid means for receiving perforate grill members adapted to present food items above the heat source within the coal well. The lid means is selectively pivotable into sealing engagement with the coal well when in an uppermost closure location within the travel of the vertically adjustable range and is movable over that range in order to present the grill support members (and hence the perforate grills themselves) at a desired vertical level over the coal well when in a cooking position.

In a preferred form of the invention, the coal well includes a segmented, downwardly tapered coal reservoir, with or without movable vents for regulating the draft therethrough, and terminating at a peripheral lip along the margin of the open top. The coal well is supported on leg members, preferably at front and rear. In the most preferred embodiment, the rear leg members have a channel configuration and include a vertical slot defining a track means. The closure lid is formed with a central panel having a peripheral skirt dimensioned to mate in sealing engagement with the outwardly directed lip on the coal well. The lid is secured to the leg supports by means of an adjustable fastener at either opposed corner of the former, such as a threaded fastener disposed through the track means. When the lid is at the upper travel of the track means it is pivotable into sealing engagement with the coal well, whereas the lid may be adjusted over the range permitted within the slot or track means by loosening the fixture member, positioning the lid and thence tightening the fixture member at the desired location. In that way, the grill support means may be positioned at a desirable vertical level vis-a-vis the coal well and, therefore, present the perforate grill(s) at the level desired by the user. Versatility is further improved upon by providing grill support members having plural channels for receipt of those perforate grill members as well.

Other advantages of the present invention, and a fuller appreciation of its construction and mode of operation, will be gained upon an examination of the following detailed description thereof, taken in conjunction with the figures of drawing, wherein:

DETAILED DESCRIPTION OF THE INVENTION

Figure 1:
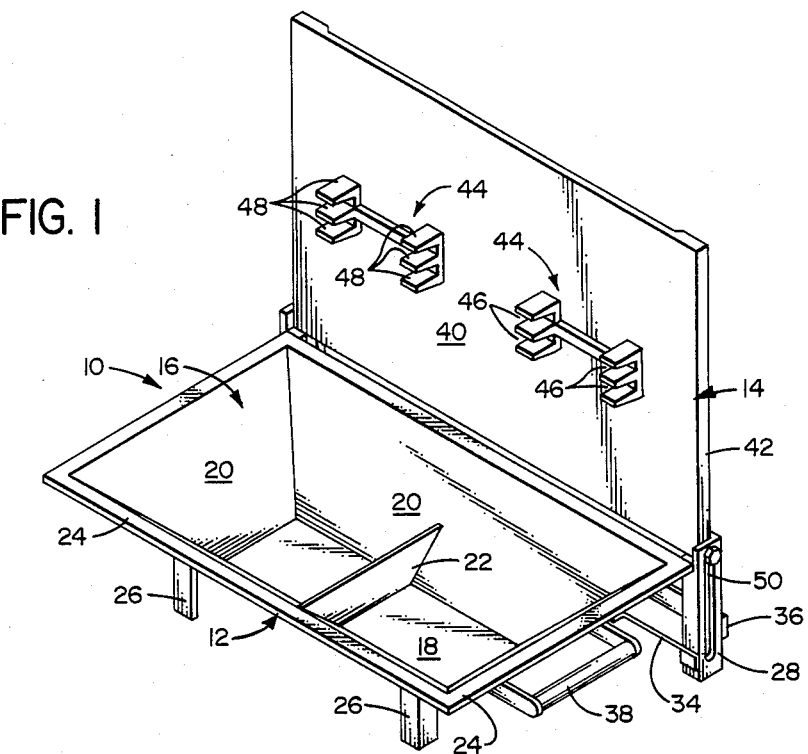
FIG. 1 is an isometric view of a barbecue cooking unit in accordance with the present invention.

The present invention relates, generally, to barbecue cooking units and, more especially, to a portable, self-extinguishing barbecue grill having a closure member for sealing engagement with the coal well of the unit in order to smother burning coals following a cooking procedure. Accordingly, the present invention will now be described with reference to certain preferred embodiments within the aforementioned context; albeit, those skilled in the art will appreciate that such a description is meant to be exemplary and should not be deemed limitative.

Turning to the figures of drawing, in all of which like parts are identified with like reference characters, a barbecue cooking unit in accordance with the present invention, designated generally as 10, is shown to be comprised of a body identified generally as 12 and a cover identified generally as 14. The body 12 includes a coal well 16 having an open top, defined within the contours of a bottom wall 18 and upstanding sidewalls 20, for receiving charcoal or other fuel to be burned. In the preferred form, the sidewalls taper outwardly in order to give the coal well 16 an overall trapezoidal shape opening upwardly toward an open top. As is sometimes the design, the coal well 16 is partially segmented by an internal subwall 22 extending across the bottom wall 18 intermediate opposed sidewalls in the longitudinal dimension. This will not only serve to rigidify the coal well structure somewhat, but provide compartmentalized regions on either side of thereof for retaining charcoals or similar materials which serve as a heat source. That wall may also be employed to support an internal perforate rack (not shown) on which the coals may be supported upwardly of the bottom wall 18 in order to allow combustion air to circulate beneath the coals and further provide a region for confining ash which is generated upon combustion. Regardless of such considerations, the coal well further includes a peripheral, outwardly directed lip 24 about the upper edges of the sidewalls 20, in this instance defining a rectilinear sealing lip at the open top of the well.

Figure 3:
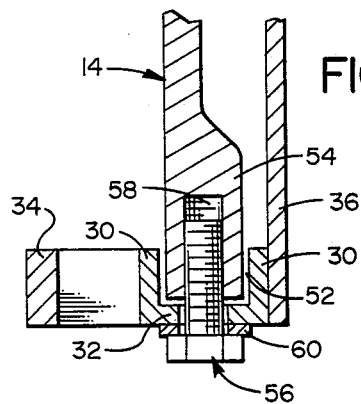
Figure 2:
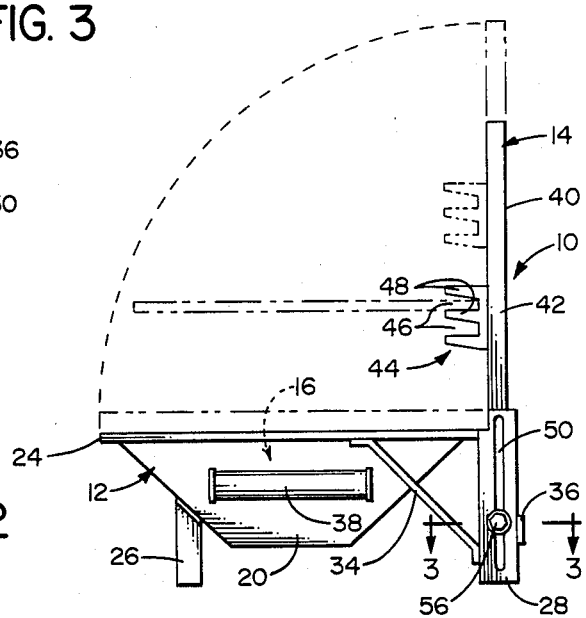
FIG. 2 is a side elevation view of the barbecue cooking unit of FIG. 1, showing in phantom lines both a closure configuration and an adjustable cooking configuration; and, FIG. 3 is a sectional view, taken substantially along the line 3—3 of FIG. 2.

The body of the unit, 12, is maintained to present the coal well in a generally upright position by support means. In the exemplified embodiment, the support means include a pair of front legs 26 and rear legs 28. As illustrated, the legs 26 are simple right angled legs fabricated from angle stock and welded to the frontal sidewall 20 as best viewed in FIG. 2. The rear legs 28 are in the nature of channels, as best viewed, for example, in FIG. 3. Thus, in this latter instance, each leg includes opposed side flanges 30 and a bridging web 32 to define an overall "U"-shaped cross section. The rear legs 28 are stabilized by means of bracing members 34 welded along one of the flange members 30 at the one end and beneath the peripheral lip 24 at the other end as best viewed in FIG. 2, thus giving the unit 10 greater support and stability when in use. A cross brace 36 between the two rear legs 28 from the opposed flange members 30 is preferably included for this self-same purpose. For the sake of convenience, handle members 38 provided at either transverse side of the unit 10.

The cover member 14 is designed to achieve at least two separate functions depending upon the mode or configuration of the barbecue unit 10. In a storage mode, or one which is adopted immediately following a cooking procedure, the cover means 14 serves to extinguish residual coals or embers housed within the coal well 16. On the other hand, during that cooking operation, the cover serves as an adjustable support means for perforate grill members used to support the food items at a convenient or desirable vertical height above the heat source. With those two thoughts borne in mind, the cover means 14 is comprised of a central panel 40 having a generally rectilinear configuration and bounded by downwardly depending peripheral skirt members 42. The panel with depending skirt is dimensioned so that it may close tightly over the sealing lip 24 along the open edge of the coal well 16, as best viewed in phantom lines in FIG. 2. The skirt closes either over the sealing lip 24 or, depending upon the designer's choice, may simply rest tightly along the edge thereof. In either of such events, the objective is to provide sufficient sealing engagement between the cover means 14 and the coal well 16 precluding the further admission of combustion air to the embers which, under such circumstances, will be extinguished. The cover member 14 also includes first and second grill support members 44 of generally identical design. In each case these grill members include first and second arrays of grill receiving channels 46 defined between outwardly extending prongs 48 for presenting perforate grills as shown in phantom in FIG. 2. The two grill support members are disposed on either side of the interior face of the panel 40 in registration so that a single grill member may be received across both grill supports; alternatively, half-sized grills having a dimension approximately the same as each of the segmented portions of the coal well might be utilized. In that latter instance, for the sake of convenience, one has the option to stagger the two grills in a vertical sense in order to have one or the other closer to the heat source in order to have a faster cooking procedure for one type of food item versus another. With that same thought in mind, while the preferred embodiment shows but two grill receiving channels 46 for each of the support members 44, a greater number might be included in order to yield a greater range of adjustability.

Further along those lines, the cover member 14 is most preferably disposed for vertical adjustment itself over a range to present the cooking level at a preselected, desirable height over the burning coals. To accommodate that objective, each of the opposed rear legs 28 is formed with a longitudinal slot 50 in the bridging leg 32; this slot along with the channel shape of the leg defining track means 52 best viewed in FIG. 3. The edges of the cover 14 include a thicker region 54 for receipt of an adjustable fastening means 56. In the illustrated embodiment, the adjustable fastening means 56 is in the form of a threaded fastener such as a bolt disposed within a blind, corresponding threaded hole 58. A washer 60 is most preferably sandwiched between the head of the bolt 56 and the outer surface of the briding leg 32 of support 28 to present a smoother surface for sliding engagement of the cover 14 within the channel 52. Irrespective of that consideration as is now evident from a review of the figures of drawing, the adjustable fixture 56 may be loosened at either opposed side where the cover 14 fits within the slots of the rearward legs 28 and that cover may be positioned over the range permitted by the slot 50. When so positioned at an appropriate level to present the grill support members 44 at the desired height for cooking, the opposed fixture members may then be tightened. For the sake of user convenience, the adjustable fixtures 56 might include a "wing nut" configuration or have some other means for grasping the same manually so that a tool is not required to make this adjustment. In any event, however, the cover 14 is thus pivotally secured to the support so that it may rotate as best envisioned with reference to FIG. 2 into a closure or sealing configuration and is selectively vertically disposed in sliding receipt within the track means 52 in a cooking position or configuration. And further, the lid in its static cooking configuration doubles as a guard or shield against wind blowing across the cooking surface improving further on the operational efficiency of the unit.

While the invention has now been described with reference to certain preferred embodiments, those skilled in the art will appreciate that various substitutions, omissions, changes and modifications may be made without departing from the spirit thereof. Accordingly, it is intended that the scope of the present invention be determined with reference to the claims granted herein.

What is claimed is:

1. A barbecue cooking unit, comprising:
   a. a coal well having an open top, defined within a bottom wall and upstanding side walls;
   b. support means for securing said coal well in a generally upright position;
   c. lid means for covering said open top, depending from said support means in pivotable engagement therewith from a closure position and in vertically sliding receipt therewith over an adjustable range in a cooking position; and,
   d. grill support means on said lid means for receiving perforate grill members and presenting the same at a preselected height over said open top;

wherein said lid means is selectively pivotable into sealing engagement with said coal well for extinguishing coals contained therein when in said closure position and is selectively slideable over said range to present said grill support means at a desired vertical level over said coal well when in said cooking position.

2. The barbecue cooking unit of claim 1, wherein said support means include generally vertical track means receiving said lid means.

3. The barbecue cooking unit of claim 2, wherein said support means comprise first and second leg means having generally U-shaped channel cross sections and vertical slots formed therein and said lid means include adjustable fixture means extending outwardly of opposed corners thereof, through said slots and into releasable engagement with said leg means.

4. The barbecue cooking unit of claim 3, wherein said coal well includes an outwardly extending peripheral lip about said open top and said lid means includes a downwardly extending peripheral skirt configured for mating engagement with said lip to seal said coal well.

* * * * *